UNITED STATES PATENT OFFICE.

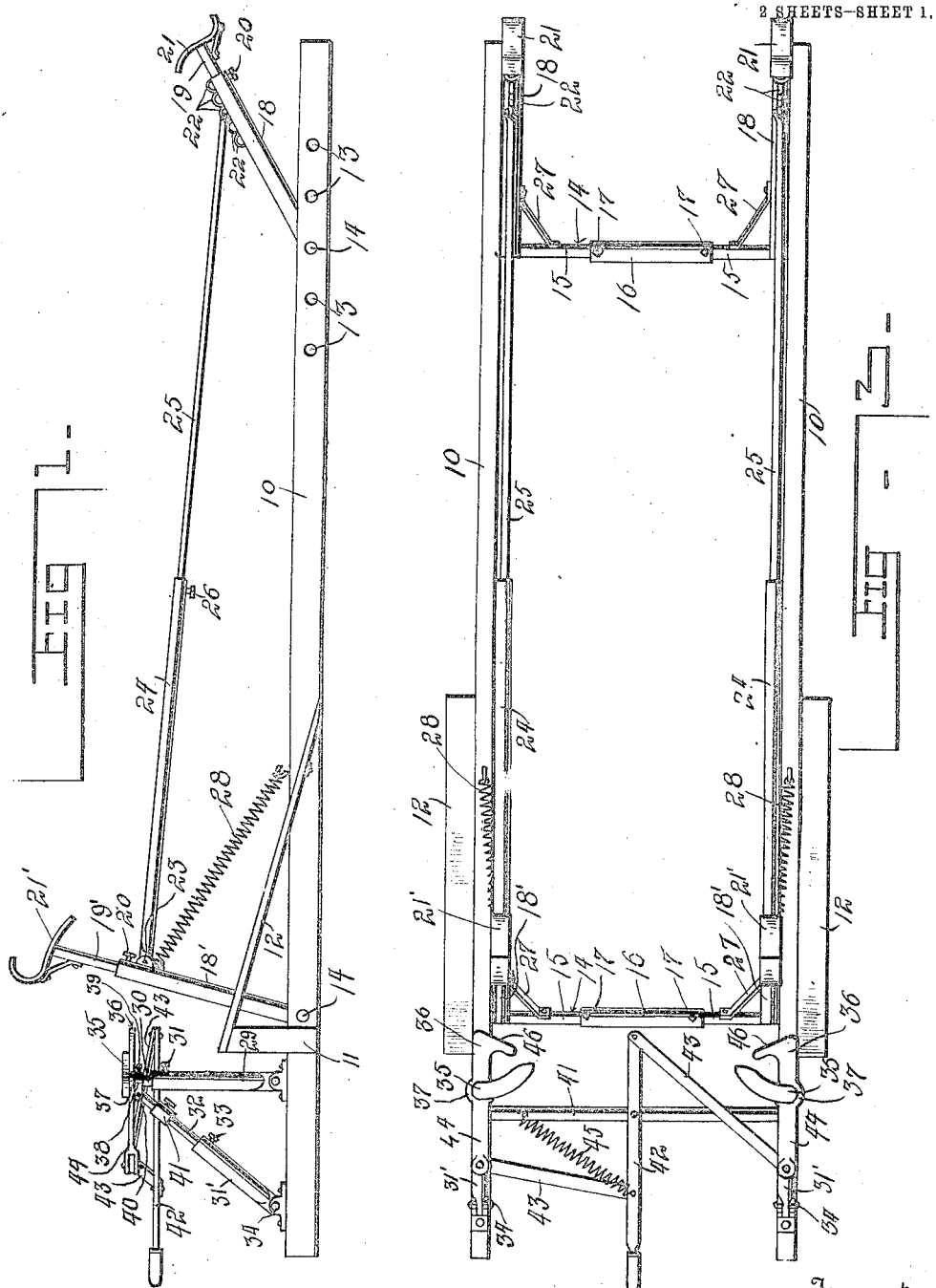

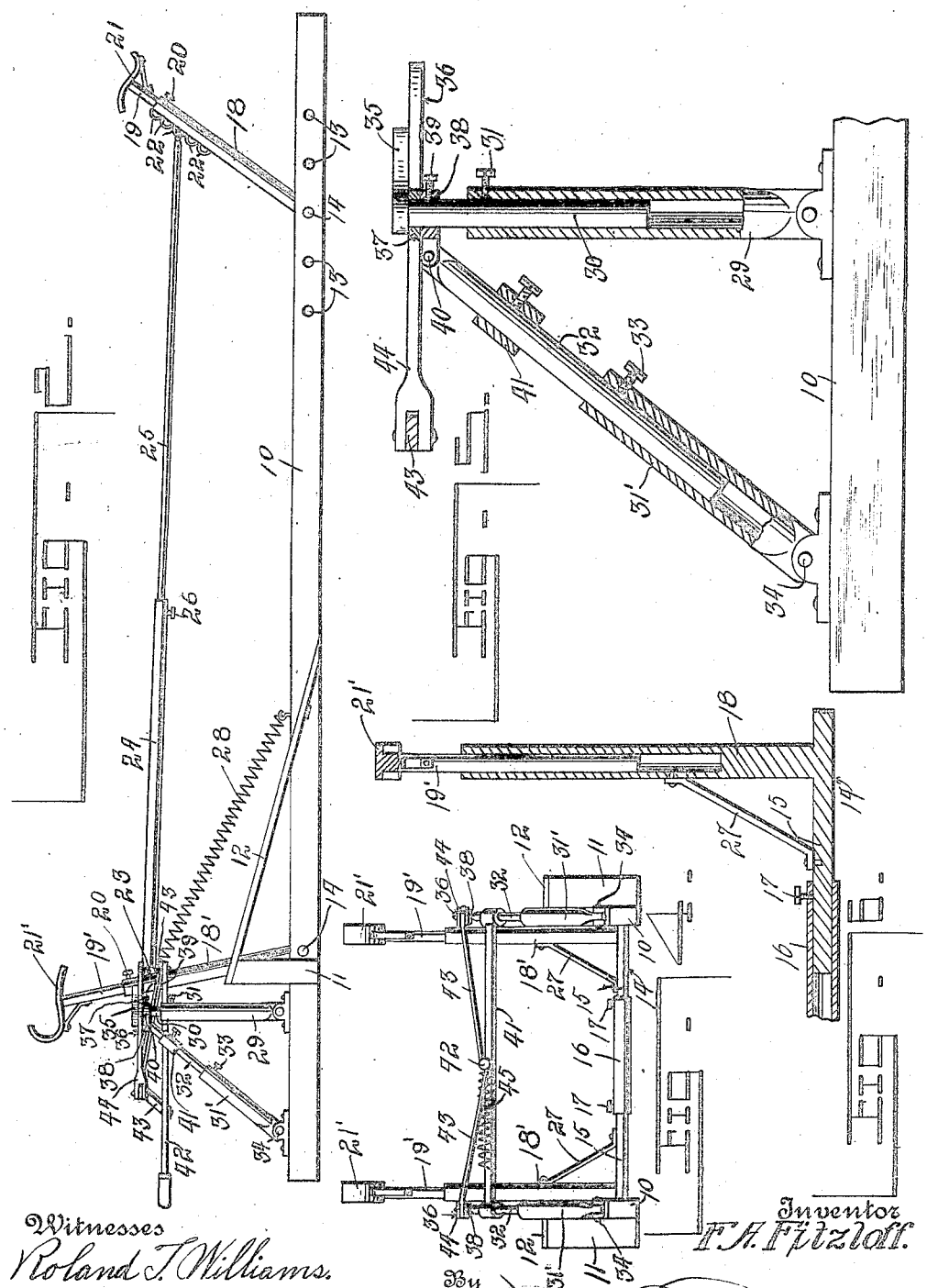

FRANK A. FITZLOFF, OF SPENCER, IOWA.

AUTOMOBILE AUTOMATIC LIFTING-JACK.

1,115,295.

Specification of Letters Patent. Patented Oct. 27, 1914.

Application filed May 14, 1913. Serial No. 767,653.

*To all whom it may concern:*

Be it known that I, FRANK A. FITZLOFF, a citizen of the United States, residing at Spencer, in the county of Clay, State of Iowa, have invented certain new and useful Improvements in Automobile Automatic Lifting-Jacks; and I do hereby declare the following to be a full, clear, and exact description of the invention, such as will enable others skilled in the art to which it appertains to make and use the same.

This invention relates to lifting jacks, and it more particularly relates to an improved form of automobile automatic lifting jack.

An object of the invention is to provide a device of this character designed to be stationed on the floor of a garage in position for receiving an automobile when it enters said garage, so that the chauffeur or owner of the automobile may drive it upon the lifting jack by its own power and momentum, so as to effectually support the automobile independently of its wheels.

Another object of the invention is to provide a lifting jack of this character which automatically dismounts the automobile therefrom when it is released for use.

Another object of the invention is to provide a lifting jack of this character which is adjustable throughout, so as to accommodate automobiles of all sizes.

Another object is to provide a device of this character which is strong, durable, comparatively inexpensive and thoroughly efficient.

Other objects and advantages may be recited hereinafter and in the claims.

In the accompanying drawings, which supplement this specification: Figure 1 is a side elevation view of my improved automobile automatic lifting jack. Fig. 2 is a view similar to Fig. 1, except being in automobile-supporting position. Fig. 3 is a top plan view of the device in its non-supporting position. Fig. 4 is a front elevation view. Fig. 5 is an enlarged detail view of one of the front members which comprise the stopping and locking devices, and Fig. 6 is an enlarged detail view of one of the adjustable supporting standards.

Referring to these drawings, in which similar reference characters correspond with similar parts, throughout the several views: the device consists of a pair of horizontal beams 10, standards 11 secured to and extending up from the beams, and a pair of inclined boards or track elements 12, having their lower ends secured to the respective beams 10, while the upper ends are secured on the respective standards 11. The beams 10 are provided with a series of apertures 13 in which may be interchangeably and rotatably seated an axle or pivotal member 14. This pivotal member consists of the end sections 15 and the relatively large middle section 16; the section 16 being preferably formed of gas pipe or other tubular elements which telescope with the sections 15. Set screws 17 or other proper securing means may be employed for holding the sections 15 and 16 in adjusted position. Rigidly secured on each element 15 is a standard 18, which is also of tubular construction, and is provided with an adjustable extension 19 which telescopes therewith, a set screw 20 being provided for securing the elements 18 and 19 in adjusted position. Upon the top of each standard extension 19 is mounted a saddle 21 of any proper construction, while upon the element 18 is a series of eyes 22. The front axle 14 is similar to the rear axle, but the front standards 18' are slightly different from the rear standards, having a hinge connection or joint 23.

An adjustable or telescoping link connects with the hinge joint 23 and with any of the eyes 22, and this link comprises a tubular section 24, a rod 25 telescoping with the element 24, and a set screw 26 being employed for fixing the adjustment of each said link. These standards 18' are provided with telescoping extensions 19 having saddles 21' on their upper ends; set screws 20 being employed for fixing the adjusted position of the telescoping elements 18' and 19. Braces 27 have their ends connected to the axles and opposite standards respectively, so as to hold the latter in parallel and rigid relation with each other. Retractile springs 28 have their respective front ends connected to the front standards 18', their rear ends being connected to the respective beams 10, and these springs are adapted to draw the front standards rearward into their normal position and coact therewith and with the links which connect with the rear standards, for moving and holding the latter in their normal position.

Upon the forward end of each beam 10 is hingedly mounted a standard 29, having an upper section 30 telescoping therewith, a set screw 31 being employed for holding the elements 29 and 30 in adjusted position. A tubular brace element 31' and a telescoping element 32 are held in adjusted position by a set screw 33, being hingedly mounted to the frame 10 at 34. Each element 30 has a stop element or rest 35 at its top, and immediately below this rest is a hook or detent 36, formed on a bearing 37 which is journaled on the element 30 and held in place by means of a collar 38 and a set screw 39. The collar 38 has a hinge element 40 thereon which connects with the element 32.

The standards and brace elements and their adjuncts (30 to 40 inclusive) are duplicated at opposite sides of the device and are connected by means of a strut or supporting bar 41 and at the middle of this bar is pivotally mounted a hand lever 42 having links 43 pivotally connected thereto, and each of these links pivotally connects with one of the arms 44 which extend radially from the bearing 37. A spring 45 connects with the bar 41 and the hand lever 42, so as to hold the latter in its normal position.

The hooks 36 are preferably angular, each being provided with a cam surface 46 against which the standards 18' are adapted to impinge and slide into engagement with the crescent-shaped or arcuate stop elements 35.

In operation, the device having been previously adjusted to suit the attending circumstances, the automobile wheels are guided by the sides of the beams 10, so that the front wheels are directed to travel upon the track elements 12 and so that the front axle moves into engagement with the saddles 21' at the moment that the rear axle is directly over the saddles 21. At this stage, the momentum of the automobile causes the standards 18' to swing forward, and motion is thereby imparted, through the medium of the link elements 24 and 25, to the rear standards 18, and the rear end of the automobile is thereby raised; while the forward end thereof is raised by the front standard, so that the automobile may now swing clear of the floor and of the track elements 12, in a forward direction, until the stop elements 35 engage with the standards 18', and the hooks 36 also engage with said standards and thereby prevent the automobile from swinging rearwardly on the supporting standards. During the swinging movement of the automobile, the springs 28 become more and more taut, so as to check and cushion the movement of the automobile, and thereby prevent undue shock when the standards 18' are arrested by the stops 35. When the automobile is thus supported, it is seen that the forward standards 18' are slightly inclined forwardly, while the rear standards 18 have a somewhat greater inclination in a rearward direction, and therefore, the weight of the rear end of the automobile tends to draw the front standards rearward, through the medium of the link elements, and the springs 28 also tend to swing the automobile rearwardly, so that when the hooks 36 release the standards 18', the automobile swings easily rearward until its front wheels travel upon the track elements 12 and its rear wheels travel upon the floor of the garage; and therefore, after the jack has been properly adjusted and prepared, this motion of the machine eliminates the necessity for cranking it, as is obvious.

From the foregoing, it will be seen that I have provided a device of this character which is fully capable of attaining the foregoing objects, in a thoroughly practical and efficient manner, so that the wheels of the automobile may be easily removed for repairing or lubricating, and the tires are relieved of the dead weight of the automobile during its storage.

I do not limit my invention to the exact details of construction, combination and arrangement of parts, as herewith illustrated and described, but my invention may only be limited by a reasonable interpretation of the claims.

I claim:

1. In an automobile jack mechanism, the combination with parallel track members, of rear jacks pivoted to said track members and adapted to support the rear axle of an automobile, front jacks pivoted to said track members and adapted to support the front axle of an automobile, links connecting said front jacks with said rear jacks, a pair of standards on said track members in advance of said front jacks, horizontally swinging hooks pivoted on said standards and having cam surfaces engaged by said front jacks when the latter are moved forwardly whereby said hooks are moved outwardly, a tension means for automatically moving said hooks inwardly to engage in rear of said front jacks and hold all of said jacks in position to support the automobile above said track members, a bar connecting said standards, a lever pivoted on said bar, links connecting said lever with said hooks whereby upon manipulation of said lever the hooks are released from said standards, and curved horizontally disposed stop members fixed to said standards at the pivots of said hooks and adapted to embrace and form abutments for the front sides of said front jacks when said hooks are engaging the rear sides of said front jacks whereby said jacks are positively held against lateral displacement.

2. In an automobile jack mechanism, the combination with parallel track members, of rear jacks pivoted to said track members and adapted to support the rear axle of an automobile, front jacks pivoted to said track members and adapted to support the front axle of an automobile, links connecting said front jacks with said rear jacks, said jacks being elevated by the momentum of an automobile driven against the forward jacks, and means for holding said jacks in their elevated positions, said means comprising a pair of standards secured on said track members adjacent said front jacks, rigid stops secured on said standards, and movable latch members pivoted on said standards and adapted to coöperate with said stops for embracing said standards, said latch members being provided upon their front faces with cam surfaces engageable by said standards for moving said members and a coil spring for holding said latch members normally in the path of movement of said forward jacks.

In testimony whereof, I affix my signature, in the presence of two witnesses.

FRANK A. FITZLOFF.

Witnesses:
　CHAS. R. HOWE,
　A. E. ANDERSON.